United States Patent [19]

Tomlin et al.

[11] Patent Number: 4,519,636
[45] Date of Patent: May 28, 1985

[54] SEAL FOR AN UNDERWATER CONNECTOR

[75] Inventors: Jerry B. Tomlin, Sugar Land; Gustave S. Levey, Houston; Michael A. O'Neil, Dallas, all of Tex.

[73] Assignee: Koomey, Inc., Brookshire, Tex.

[21] Appl. No.: 435,512

[22] Filed: Oct. 20, 1982

[51] Int. Cl.³ ............................................. F16L 33/16
[52] U.S. Cl. ........................................ 285/95; 285/26;
285/39; 285/131; 285/349; 285/355; 285/379;
285/423; 285/DIG. 1; 277/50; 277/112
[58] Field of Search .................... 285/24, 25, 26, 27,
285/28, 29, 325, 347, 349, 379, 423, 355, 39,
328, DIG. 1, 334.1, 334.3, 137 R, 131, 108, 95,
DIG. 11; 277/50, 112

[56] References Cited

U.S. PATENT DOCUMENTS

| 2,110,127 | 3/1938 | Hinderliter | 285/108 |
| 3,701,549 | 10/1972 | Koomey et al. | |
| 3,820,600 | 6/1974 | Bough | 285/26 X |
| 4,214,779 | 7/1980 | Losell | 285/334.3 X |

FOREIGN PATENT DOCUMENTS

| 2854795 | 6/1979 | Fed. Rep. of Germany | 285/334.1 |
| 11418 | 1/1977 | Japan | 285/355 |
| 861531 | 2/1961 | United Kingdom | 285/334.1 |

Primary Examiner—Dave W. Arola
Attorney, Agent, or Firm—Fulbright & Jaworski

[57] ABSTRACT

A seal for use in an underwater connector having first and second mating members each of which has a coacting mating surface with a plurality of fluid passageways for mating with the passageways of the other member. The seal is a resilient tubular member having threads on a portion of its outer diameter for connection to a passageway on one of the members. The seal includes a fluid sealing surface on its outer end for mating with the other member and the seal includes a fluid sealing surface on its inner end for sealing with the one member. The sealing point of the sealing surface on the outer end has a diameter at least as great as the diameter of the sealing point of the sealing surface on the inner end. The sealing surface on the inner end is formed by an O-ring seal in a groove in the annular resilient seal. The sealing surface on the outer end includes a ridge.

12 Claims, 4 Drawing Figures

SEAL FOR AN UNDERWATER CONNECTOR

BACKGROUND OF THE INVENTION

It is known, as shown in U.S. Pat. No. 3,701,549, to provide an underwater connector for interconnecting a plurality of fluid lines with seals provided between mating passageways of the connector. However, such seals require retainers and reinforcing rings for mechanically holding the seal member in position.

The present invention is directed to an improved seal for use in an underwater connector in which the seal is not subject to being expelled by the internal pressure in the underwater connector, but instead the internal pressure in the connector acts to retain the seal in position.

SUMMARY

The present invention is directed to providing a seal for use in an underwater connector having first and second mating members, each of which has a coacting mating surface with a plurality of fluid passageways for mating with the passageways of the other member. The seal is a resilient tubular seal including threads on a portion of its outer diameter for connection to a passageway on one of the members. The seal includes a fluid sealing surface on its outer end for mating with the other member and includes a fluid sealing surface on its inner end for mating with the one member. The sealing point of the sealing surface on the outer end has a diameter at least as great as the diameter of the sealing point of the sealing surface on the other end whereby the pressure in the passageway does not act to blow the seal out of the passageway.

A still further object of the present invention is wherein the sealing point of the sealing surface on the outer end of the seal has a diameter greater than the diameter of the sealing point of the sealing surface on the inner end whereby the pressure in the passageways acts on the seals to retain them in position.

Still a further object of the present invention is wherein the sealing surface on the inner end of the seal is made integrally therewith or is formed by an O-ring seal in a groove in the annular resilient seal.

Still a further object of the present invention is wherein the sealing surface on the outer end of the seal includes a ridge extending outwardly from the outer end of the seal.

Yet a still further object of the present invention is wherein the thread on the seal is intermediate the outer end and the inner end of the seal and the outer diameter of the outer end in the inner end is adapted to be supported by the one member for preventing outward expansion.

Yet a still further object of the present invention is wherein the annular resilient seal is preferably made of polyurethane.

Still a further object of the present invention is the provision of an underwater connector for connecting a plurality of fluid lines having first and second mating members in which each member has a coacting mating surface with a plurality of fluid passageways for mating with the passageways of the other member and the improvement in seal means on the mating surface of one of the members for sealing between the mating passageways of the members. The seal is an annular resilient seal threadably connected to each of the passageways on one member, and includes a fluid sealing surface on its outer end for mating with the other member, and includes a fluid sealing surface on its inner end for sealing with the one member. The sealing point of the sealing surface on the outer end has a diameter greater than the diameter of the sealing point of the sealing surface on the inner end of the seal. The sealing surface on the inner end is formed by an O-ring seal positioned in a groove in the annular resilient seal. The sealing surface on the outer end includes a ridge extending outwardly from the outer end of the seal which is narrower than the thickness of the seal. The thread on the seal is intermediate the outer end and the inner end of the seal and the outer diameter of the outer end and the inner end is supported by the passageway for preventing outward expansion.

Other and further objects, features and advantages will be apparent from the following description of a presently preferred embodiment of the invention, given for the purpose of disclosure and taken in conjunction with the accompanying drawings.

DESCRIPTION OF THE PREFERRED EMBODIMENT

While the seal of the present invention is generally useful on various types of underwater connectors, it will be described for purposes of illustration only as used on an underwater connector as described in patent application Ser. No. 259,788, filed May 1, 1981, entitled "Underwater Fluid Control Connector".

Figure 1:
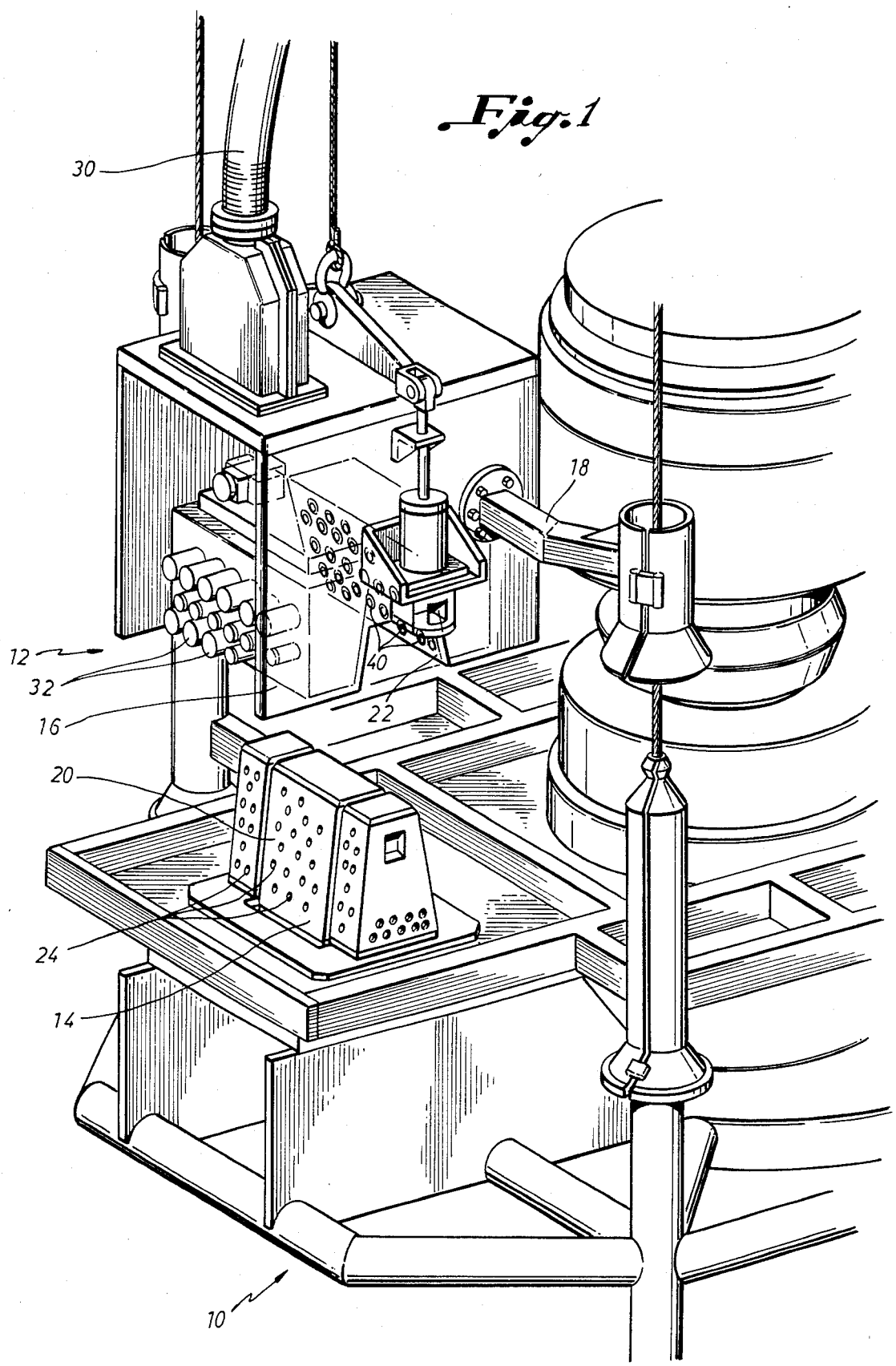
FIG. 1 is a perspective view of first and second members of an underwater connector shown in the disconnected position.

Referring now to the drawings, and particularly to FIG. 1, the reference numeral 10 generally indicates a portion of the support structure of a conventional blowout preventer stack for drilling underwater oil and/or gas wells. Various underwater equipment is attached to the blowout preventer stack and is actuated by hydraulic fluid supply and control lines leading to the well surface.

The underwater connector is generally indicated by the reference numeral 12 which includes a first underwater mating member 14 which may be adapted to be positioned and remain underwater and a retrievable member generally indicated by the reference numeral 16 which is adapted to be releasably engaged and disengaged from the underwater member 14. A suitable frame 18 is provided connected to the member 16 for providing support and guide means as the member 16 is connected to and released from the underwater member 14.

Figure 2:
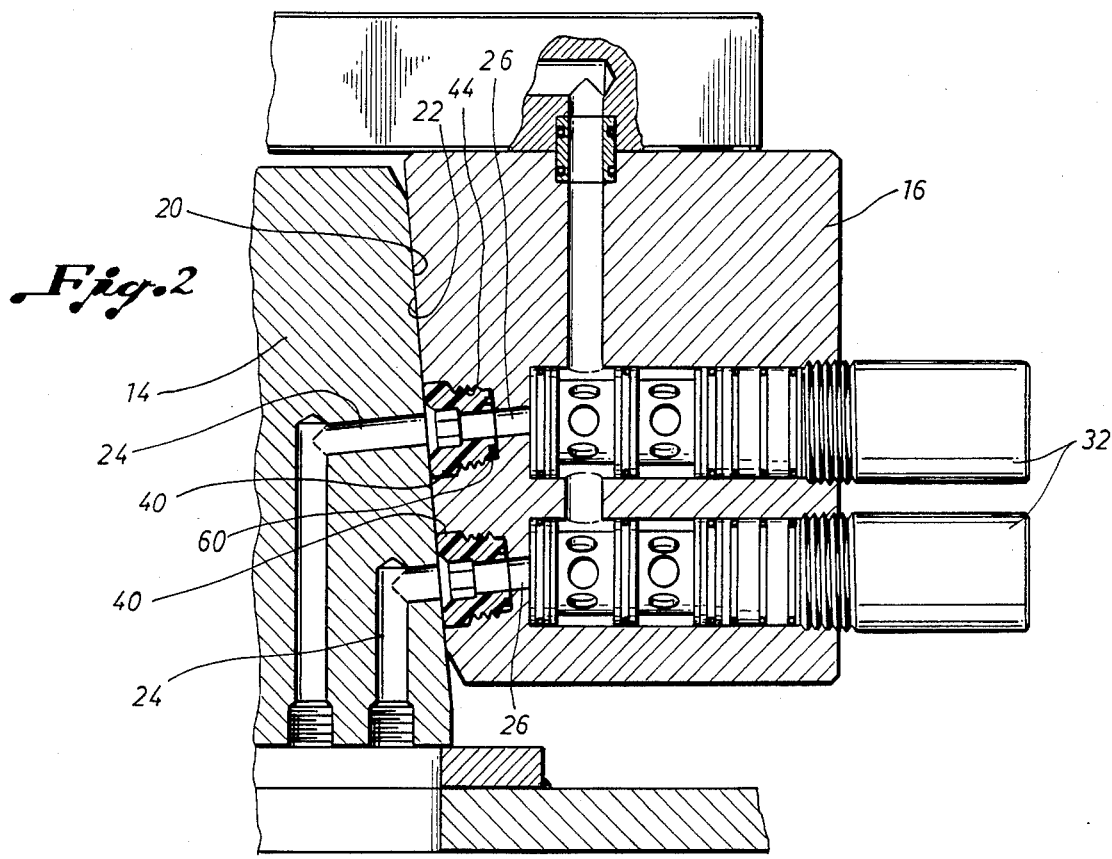
FIG. 2 is a fragmentary enlarged cross-sectional view of the first and second members of FIG. 1 shown in an engaged position.

Referring now to FIGS. 1 and 2, the mating member 14 includes one or more mating surfaces 20 for mating with mating surfaces 22 on the member 16. The mating surfaces 20 include a plurality of fluid passageways 24 for mating with fluid passageways 26 in the mating surface 22 of the member 16. The passageways 24 and 26 are adapted to mate with each other when the members 14 and 16 are in the engaged position as shown in FIG. 2.

The passageways 24 extend from the member 14 to various hydraulic underwater equipment such as blowout preventers for supplying hydraulic control fluids thereto. The member 16 receives hydraulic supply and control lines from a hose bundle 30 (FIG. 1) which can be supplied directly to or controlled by means of valves 32 for supplying control fluids to the member 14 for actuating various underwater functions.

However, in order to suitably mate the passageways 26 in the member 16 with the passageways 24 in the member 14, a suitable seal 40 is provided to insure that the interconnection between the mating passageways is fluid tight to assure the proper actuation of the underwater function and to prevent cross flow between unmated passageways.

Figure 4:
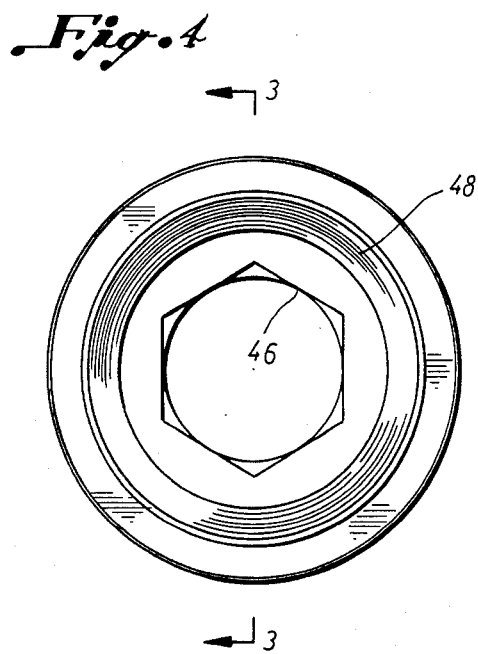
FIG. 4 is an end elevational view of the seal of FIG. 3.
Figure 3:
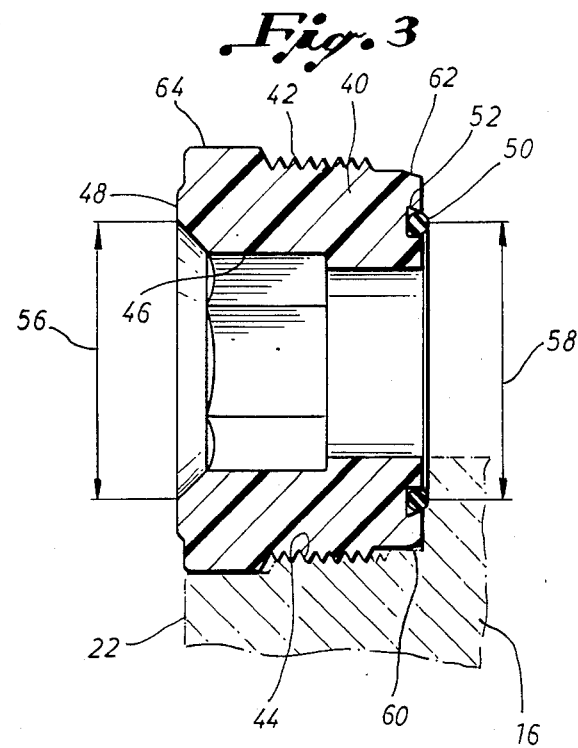
FIG. 3 is an enlarged cross-sectional view of the seal of the present invention.

Referring now to FIGS. 2-4, the seal 40 of the present invention is best seen. The seal 40 is a resilient tubular seal which may be of any suitable material such as polyurethane which has been tested and found to be satisfactory. The seal 40 includes threads 42 on a portion of its outer diameter for connection to coacting threads 44 in a passageway of one of the members such as the passageway 26 of the member 16. The seal 40 is preferably a one-piece homogenous seal body which may be molded in one piece and contains an internal hexagonal opening 46 for threading and unthreading the seal 40 into position and out of position. The seal 40 includes a fluid sealing surface 48 at its outer end for mating with the mating surface 20 of the member 14. The sealing surface 48 extends beyond the mating surface 22 of the member 16 in its free uncompressed state, for example, 0.045 inches. When the members 14 and 16 are mated, as best seen in FIG. 2, the sealing surface 48 is compressed into the pocket of the passageway 26 as the members 14 and 16 are generally seated in a near metal-to-metal contact.

The seal 40 includes a sealing surface 50 on its inner end for sealing with the member 16. While the sealing surface 50 may be integral with the seal 40, preferably the seal 50 at the inner end is provided by a conventional O-ring 50 in a groove 52 in the seal 40. It is to be noted that the seal 40 does not have a retainer or reinforcing ring as does the prior art. Conventional seals require extensive mechanical support to prevent the seal from being expelled from the member 16 when the members 14 and 16 are separated, particularly under pressure. That is, in a conventional seal the pressure in the passageway 26 acts on the inner end of the seal to blow it out of the passageway 26.

Therefore, it would normally not be expected that the threads 42 would be sufficient to retain the seal 40 in the passageway 26. However, the sealing points of the sealing surfaces 48 and 50 are positioned so as to cause the fluid pressure in the passageway 26 to act in a direction on the seal 40 to retain it in its position in the passageway 26. That is, the sealing point of the sealing surface 48 has a diameter of 56 and the sealing point of the sealing surface 50 has a diameter of 58. The diameter 56 is at least as the great as the diameter 58 and is preferably slightly greater. However, the diameter 56 is not so great as to create a differential pressure sufficient to push the seal 40 away from its sealing surface on member 14. The high pressure fluid in the passageway 26 acts on both the diameter 56 and on the diameter 58. Since the diameter 56 is preferably slightly greater than the diameter 58 the differential force on the seal 40 is in a direction to seat the seal 40 against the member 16. Therefore, the threads 42 are not required to retain the seal 40 against a large force caused by a differential pressure acting on the seal 40 to expel it from the member 16. However, in spite of the pressures acting on the seal 40, the seal 40 is a compression seal activated by the movement of members 14 and 16 together.

Preferably, the sealing surface 48 at the outer end of the seal 40 is in the form of a ridge extending outwardly from the outer end of the seal 40 and which is narrower than the thickness of the seal 40 so that when it mates with the member 14 it will provide a highly pressured compressed seal to withstand the high pressures involved.

Preferably, the thread 42 on the outer diameter of the seal 40 is intermediate its inner and outer ends. At the inner end of the seal 40 a pocket 60 is provided in the passageway 26 to enclose the outer diameter 62 of the inner end for supporting the inner end of the seal 40 to keep it from expanding outwardly when subjected to internal pressure. This additionally insures that the O-ring seal 50 will not have its diameter expanded which would increase the force of expulsion acting on the seal 40. In addition, the outer diameter 64 of the outer end of the seal 40 is adapted to be supported by the member 16 for preventing flow of the sealing surface 48.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts will be readily apparent to those skilled in the art and which are encompassed within the spirit of the invention and the scope of the appended claims.

What is claimed is:

1. In an underwater connector for interconnecting a plurality of fluid lines having first and second mating members, each member having a coacting mating surface with a plurality of fluid passageways for mating with the passageways of the other member, the improvement in seal means on the mating surface of one of the members for sealing between mating passageways of said members comprising, said passageways of said one member having threads, an annular resilient seal having a thread and threadably connected in each of the threaded passageways on said one member, said annular resilient seal having a bore therethrough, said seal including a raised sealing surface on its outer end for mating with the other member, said seal including a raised fluid sealing surface on its inner end for sealing with said one member, the center of the sealing surface on the outer end having a diameter at least as great as the diameter of the center of the sealing surface on the inner end whereby the fluid pressure in the passageways acts on the seals to prevent the fluid pressure from expelling the seals from said one member.

2. The apparatus of claim 1 wherein the center of the sealing surface on the outer end has a diameter greater than the diameter of the center of the sealing surface on the inner end.

3. The apparatus of claim 1 wherein the sealing surface on the inner end is formed by an O-ring seal in a groove in the annular resilient seal.

4. The apparatus of claim 1 wherein the annular seal is polyurethane.

5. The apparatus of claim 1 wherein the thread on the seal is intermediate the outer end and the inner end of the seal and the outer diameter of the outer end and the inner end is supported by the passageway for preventing outward expansion.

6. The apparatus of claim 1 wherein the sealing surface on the outer end includes a ridge extending outwardly from the outer end of the seal which is narrower than the thickness of the seal.

7. A seal for use in an underwater connector having first and second mating members each of which has a coacting mating surface with a plurality of fluid passageways for mating with the passageways of the other member, the passageways of one of the members having threads, comprising, a resilient tubular seal, said seal having a bore therethrough, said seal including threads on a portion of its outer diameter for connection to a threaded passageway on said one member, said seal including a raised fluid sealing surface on its outer end for mating with the other member, said seal including a raised fluid sealing on its inner end for sealing with said one member, and the center of the sealing surface on the outer end has a diameter at least as great as the diameter of the center of the sealing surface on the inner end whereby when the seal is threaded in said one member pressure in the bore of the seal acts on the seal to prevent the pressure from expelling the seal from said one member.

8. The apparatus of claim 7 wherein the center of the sealing surface on the outer end has a diameter greater than the diameter of the center of the sealing surface on the inner end.

9. The apparatus of claim 8 wherein the sealing surface on the inner end is formed by an O-ring seal in a groove in the annular resilient seal.

10. The apparatus of claim 9 wherein the sealing surface on the outer end includes a ridge extending outwardly from the outer end of the seal.

11. The apparatus of claim 10 wherein the thread on the seal is intermediate the outer end and the inner end of the seal and the outer diameter of the outer end and the inner end is adapted to be supported by said one member for preventing outward expansion.

12. The apparatus of claim 11 wherein the annular seal is polyurethane.

* * * * *